(12) United States Patent
Hsu et al.

(10) Patent No.: US 9,817,496 B2
(45) Date of Patent: *Nov. 14, 2017

(54) TOUCH PANEL

(71) Applicant: TPK Touch Solutions (Xiamen) Inc., Xiamen (CN)

(72) Inventors: I-Chung Hsu, Taipei (TW); Kuo-Shu Hsu, Xinbei (TW); Fenghua Lu, Xiamen (CN); Chenghong Xu, Shangrao (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/741,447

(22) Filed: Jun. 16, 2015

(65) Prior Publication Data
US 2015/0370357 A1  Dec. 24, 2015

(30) Foreign Application Priority Data
Jun. 19, 2014 (CN) .......................... 2014 1 0274648

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01)

(58) Field of Classification Search
None
See application file for complete search history.

(56) References Cited

U.S. PATENT DOCUMENTS

| | | | | |
|---|---|---|---|---|
| 9,658,709 B2* | 5/2017 | Hsu | ....................... | G06F 3/0412 |
| 9,665,225 B2* | 5/2017 | Hsu | ....................... | G06F 3/044 |
| 2005/0083307 A1* | 4/2005 | Aufderheide | ........... | G06F 3/044 345/173 |
| 2008/0062139 A1* | 3/2008 | Hotelling | ............ | G02F 1/13338 345/173 |
| 2013/0120283 A1* | 5/2013 | Tung | ...................... | B32B 37/12 345/173 |
| 2013/0323521 A1* | 12/2013 | Xia | ....................... | C09J 133/08 428/523 |

* cited by examiner

*Primary Examiner* — Seokyun Moon
(74) *Attorney, Agent, or Firm* — Paul Bendemire

(57) ABSTRACT

A touch panel comprises a protection substrate, a first transparent substrate, a first patterned electrode layer and a first transparent adhesive layer. The first transparent substrate is disposed opposite the protection substrate. The first patterned electrode layer is disposed on the first transparent substrate and between the protection substrate and the first transparent substrate, and includes a patterned portion and a non-patterned portion. The first transparent adhesive layer is disposed between the protection substrate and the first patterned electrode layer. The refractive index of the first transparent adhesive layer is greater than or equal to 1.65 and less than or equal to 1.72, wherein reflectivity of the patterned portion is substantially the same as the reflectivity of the non-patterned portion.

20 Claims, 6 Drawing Sheets

TOUCH PANEL

BACKGROUND OF THE INVENTION

This Non-provisional application claims priority under 35 U.S.C. §119(a) to Chinese Patent Application No(s). 201410274648.8 filed in the People's Republic of China on Jun. 19, 2014, the entire contents of which are hereby incorporated by reference.

FIELD OF THE INVENTION

This disclosure relates to touch technology and more particularly, to a touch panel.

DESCRIPTION OF THE RELATED ART

As technology progresses, touch display devices are being applied in new products at a rapid clip. Current applications of the touch display device include portable electronic products (e.g., tablet computers, cell phones, and digital cameras), commercial products (e.g., automated teller machines, and remote video conferencing) and public information applications (e.g., airport kiosks, station guides, and data querying).

A touch panel includes a protection substrate and a transparent substrate which are attached to each other. The transparent substrate includes an electrode layer used for touch sensing. The electrode layer is usually a patterned electrode layer formed by etching a whole conductive layer. Because the electrode layer has a region with electrodes (i.e. the patterned portion) and another region without electrodes (i.e. the non-patterned portion) and these two regions have different refractive indexes, the electrode pattern may be visible, due to a larger difference of reflectivity between the regions with and without electrodes when the external light is incident on the electrode layer and then reflected. Therefore, the appearance of the touch panel is degraded.

SUMMARY OF THE DISCLOSURE

In view of the foregoing problem, the present disclosure provides a touch panel whereby the problem that the electrode pattern of the touch panel is visible and the technical complexity can be solved.

A touch panel according to the disclosure comprises a protection substrate, a first transparent substrate, a first patterned electrode layer and a first transparent adhesive layer. The first transparent substrate is disposed opposite the protection substrate. The first patterned electrode layer is disposed on the first transparent substrate and between the protection substrate and the first transparent substrate, and includes a patterned portion and a non-patterned portion. The first transparent adhesive layer is disposed between the protection substrate and the first patterned electrode layer. The refractive index of the first transparent adhesive layer is greater than or equal to 1.65 and less than or equal to 1.72, wherein reflectivity of the patterned portion is substantially the same as reflectivity of the non-patterned portion.

In some embodiments, the touch panel further comprises a second patterned electrode layer disposed on the side of the first transparent substrate away from the protection substrate.

In some embodiments, the touch panel further comprises a second patterned electrode layer disposed on the protection substrate and between the protection substrate and the first transparent adhesive layer.

In some embodiments, the touch panel further comprises a refractive-index matching layer disposed between the first patterned electrode layer and the first transparent substrate.

In some embodiments, the refractive-index matching layer includes a first refractive-index matching layer and a second refractive-index matching layer, the first refractive-index matching layer is disposed between the first transparent substrate and the second refractive-index matching layer and has a refractive index in a range between 2.0 and 2.5, and the second refractive-index matching layer is disposed between the first patterned electrode layer and the first refractive-index matching layer and has a refractive index in a range between 1.3 and 1.6.

In some embodiments, the touch panel further comprises a second transparent substrate, a second patterned electrode layer and a second transparent adhesive layer. The second patterned electrode layer is disposed on the second transparent substrate and between the first transparent substrate and the second transparent adhesive layer. The second transparent adhesive layer is disposed between the first transparent substrate and the second patterned electrode layer.

In some embodiments, the touch panel further comprises a refractive-index matching layer disposed between the protection substrate and the first transparent adhesive layer.

In some embodiments, the first transparent substrate includes a glass substrate, a plastic substrate, a sapphire substrate, or a polyester thin film.

In some embodiments, the first transparent adhesive layer has a first surface and a second surface which are disposed oppositely, the first surface faces the protection substrate and the second surface faces the first transparent substrate, the refractive index of the second surface is greater than that of the first surface, and the stickiness of the first surface is greater than that of the second surface.

In some embodiments, the thickness of the first transparent adhesive layer is in a range between 150 μm and 200 μm.

A touch panel according to the disclosure comprises a protection substrate, a transparent substrate, a first patterned electrode layer and a first transparent adhesive layer. The transparent substrate is disposed opposite the protection substrate. The first patterned electrode layer is disposed on the side of the transparent substrate away from the protection substrate and includes a patterned portion and a non-patterned portion. The first transparent adhesive layer is disposed between the protection substrate and the transparent substrate. The refractive index of the first transparent adhesive layer is greater than or equal to 1.65 and less than or equal to 1.72, wherein reflectivity of the patterned portion is substantially the same as reflectivity of the non-patterned portion.

In some embodiments, the first transparent adhesive layer has a first surface and a second surface which are disposed oppositely, the first surface faces the protection substrate and the second surface faces the transparent substrate, the refractive index of the second surface is greater than that of the first surface, and the stickiness of the first surface is greater than that of the second surface.

In some embodiments, the transparent substrate and the first patterned electrode layer are formed on a carrying substrate and then transferred to the protection substrate.

In some embodiments, the thickness of the transparent substrate is in a range between 0.1 μm and 15 μm.

In some embodiments, the touch panel further comprises a refractive-index matching layer disposed between the transparent substrate and the first patterned electrode layer.

As mentioned above, in the touch panel of this disclosure, the protection substrate and the first transparent substrate are attached together by the first transparent adhesive layer of high refractive index. Accordingly, the first transparent adhesive layer not only provides the adhesion effect, but also makes the reflectivities of the patterned and non-patterned portions of the patterned electrode layer reach the same by its particular high refractive index, so that the electrode pattern of the touch panel is less visible or even invisible. Therefore, the appearance effect of the touch panel can be improved, and besides, the multi-layer optical film (or a plurality of optical films) can be reduced so that the touch panel can be made lighter and thinner and the manufacturing method can be simplified.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

To be noted, the terms of "on" and "below" or "up" and "down" in the following illustration are just for showing the relative position of the elements. Besides, the case where a first element is formed on, above, over, below or under a second element can include the following meanings. That is, the first element can directly contact the second element, or an additional element is disposed between the first element and the second element, so that the first element and the second element are without the direct contact.

Figure 1A:
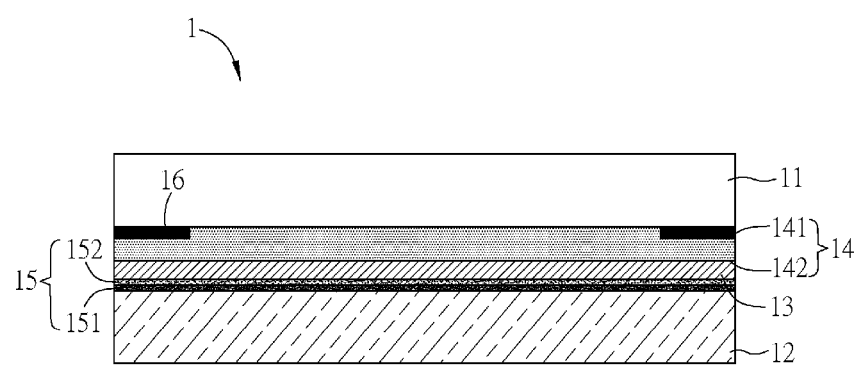
FIG. 1A is a schematic sectional diagram of a touch panel in accordance with one embodiment of the disclosure.

FIG. 1A is a schematic sectional diagram of a touch panel 1 in accordance with various embodiments of the disclosure. As shown in FIG. 1A, the touch panel 1 includes a protection substrate 11, a first transparent substrate 12, a first patterned electrode layer 13 and a first transparent adhesive layer 14. The first transparent substrate 12 is disposed opposite the protection substrate 11. The protection substrate 11 is a glass substrate, plastic substrate or sapphire substrate. The protection substrate 11 is a strengthened substrate where the six surfaces thereof are chemically strengthened or only the upper and lower surfaces are chemically strengthened and the side surfaces are physically strengthened, in order to prevent the inner structure of touch panel 1 from being damaged when the user presses the touch panel 1. The first transparent substrate 12 includes a glass substrate, a plastic substrate, a sapphire substrate, or even a polyester thin film such as a PET film or a polyimide film to carry the first patterned electrode layer 13. Herein for example, the first transparent substrate 12 is a glass substrate, and the glass substrate can enhance the whole structural strength of the touch panel 1.

The first patterned electrode layer 13 is disposed on the first transparent substrate 12 and between the protection substrate 11 and the first transparent substrate 12. In some embodiments, the first patterned electrode layer 13 is directly disposed on the first transparent substrate 12 and is formed by exposure, development or etching. Furthermore, the first patterned electrode layer 13 includes uniaxial touch electrodes (such as a comb-shaped electrode) or biaxial touch electrodes (such as two axial electrodes crossing each other), with biaxial electrodes illustrated here, for example, but this disclosure is not limited thereto. The first patterned electrode layer 13 is, for example, but not limited to, metal nanowire, transparent conductive film or metal mesh. For example, the metal nanowire is silver nanowire (SNW) or carbon nanotubes (CNT) and the transparent conductive film is indium tin oxide (ITO), indium zinc oxide (IZO), fluorine doped tin oxide (FTO), aluminum doped zinc oxide (AZO) or gallium doped zinc oxide (GZO).

Figure 1B:
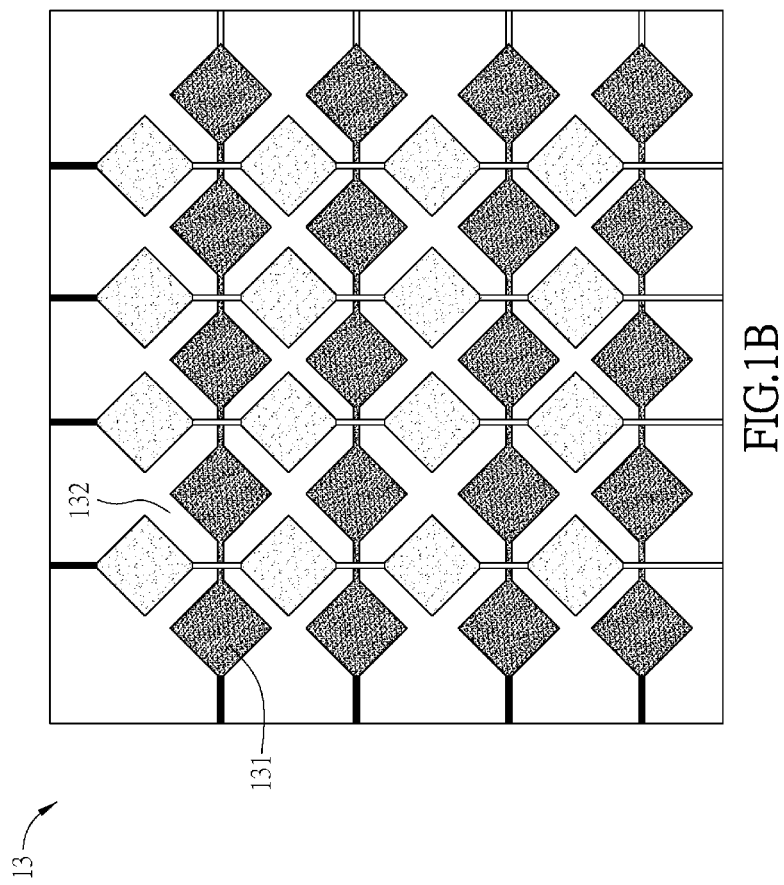
FIG. 1B is a schematic top view of the first patterned electrode layer in FIG. 1A.

FIG. 1B is a schematic top view of the first patterned electrode layer in FIG. 1A. As shown in FIG. 1A and FIG. 1B, the first patterned electrode layer 13 includes a patterned portion 131 and a non-patterned portion 132. The patterned portion 131 is the portion of the above-mentioned touch electrode, which is, for example, the combination of a plurality of blocks or strips, and the blocks are given as an example here. The non-patterned portion 132 is the portion excluding the touch electrodes and mainly includes the region between the block-shaped touch electrodes. In configurations not including the first transparent adhesive layer 14, since the patterned portion 131 has the conductive material with the refractive index mainly of the touch electrodes, and the non-patterned portion 132 is without the conductive material so as to have the refractive index of the first transparent substrate 12, the refractive indexes of the patterned portion 131 and non-patterned portion 132 are different. Accordingly, the patterned portion 131 and the non-patterned portion 132 have very different reflectivity. The optical density of the patterned portion 131 is higher, i.e. less pervious to light, such that the patterned portion 131 of the first patterned electrode layer 13 is readily visible to the user when the external light reaches the first patterned electrode layer 13 through the protection substrate 11 and is then reflected to the outside through the first patterned electrode layer 13.

As shown in FIG. 1A and FIG. 1B, the first transparent adhesive layer 14 is disposed between the protection substrate 11 and the first patterned electrode layer 13 to connect the protection substrate 11 to the first transparent substrate 12. The first transparent adhesive layer 14 is different from the normal optically clear adhesive (OCA), which has a refractive index similar to glass in a range between 1.48 and 1.5 and only functions for adhesion. However, the first transparent adhesive layer 14 of this disclosure, in comparison with the normal OCA, has a higher refractive index, which is favorably greater than or equal to 1.65 and less than or equal to 1.72 and favorably 1.68 for 550 nanometer wavelength light, so that the patterned portion 131 and the non-patterned portion 132 have the same reflectivity. Favorably, the reflectivities of the patterned portion 131 and non-patterned portion 132 are identical or substantially the same, and that is, the difference of the reflectivities between the patterned portion 131 and the non-patterned portion 132 is reduced. Thereby, the visibility of the patterned portion 131 is effectively reduced and the appearance of the touch panel can be improved.

Particularly, the first transparent adhesive layer 14 has a first surface 141 and a second surface 142 which are disposed oppositely. The first surface 141 faces the protection substrate 11 and the second surface 142 faces the first transparent substrate 12. The refractive index of the second surface 142 is greater than that of the first surface 141, and the stickiness of the first surface 141 is greater than that of the second surface 142. In other words, the higher refractive index, which is greater than or equal to 1.65 and less than or equal to 1.72, of the second surface 142 of the first transparent adhesive layer 14 can help in reducing the visibility of the patterned portion 131 of the first patterned electrode layer 13, and the higher stickiness of the first surface 141 can help the connection of the protection substrate 11 and first transparent substrate 12. The thickness of the first transparent adhesive layer 14 is in a range between 150 µm and 200 µm, and thereby, the disposition of the first transparent adhesive layer 14 between the protection substrate 11 and the first transparent substrate 12 can both connect the protection substrate 11 and the first transparent substrate 12 and reduce the visibility of the patterned portion 131.

In some embodiments, the touch panel 1 further includes a refractive-index matching layer 15 which is disposed between the first patterned electrode layer 13 and the first transparent substrate 12 and is a single-layer or multi-layer structure. Refractive index and thickness of the refractive-index matching layer 15 can be adjusted according to the refractive index (N value) and extinction coefficient (K value) of the first patterned electrode layer 13 and the refractive index and thickness of the first transparent adhesive layer 14, so as to further reduce the visibility of the patterned portion 131. For example, the refractive index of the patterned portion 131 of the first patterned electrode layer 13 is in a range between 1.48 and 2.03, the extinction coefficient of the patterned portion 131 of the first patterned electrode layer 13 is in a range between 0.006 and 0.55, the refractive index of the first transparent adhesive layer 14 is in a range between 1.65 and 1.72, and the thickness of the first transparent adhesive layer 14 is in a range between 150 µm and 200 µm. In some embodiments, the refractive-index matching layer 15 includes a first refractive-index matching layer 151 and a second refractive-index matching layer 152. The first refractive-index matching layer 151 is disposed between the first transparent substrate 12 and the second refractive-index matching layer 152, and the second refractive-index matching layer 152 is disposed between the first patterned electrode layer 13 and the first refractive-index matching layer 151. The material of the first refractive-index matching layer 151 is, for example but not limited to, $Nb_2O_5$, and the material of the second refractive-index matching layer 152 is, for example but not limited to, $SiO_2$. The thickness of the first refractive-index matching layer 151 is in a range between 4 nm and 20 nm, and the refractive index thereof is in a range between 2.0 and 2.5. The thickness of the second refractive-index matching layer 152 is in a range between 20 nm and 60 nm, and the refractive index thereof is in a range between 1.3 and 1.6. Thereby, the refractive-index matching layer 15, the first patterned electrode layer 13 and the first transparent adhesive layer 14 is used for matching the refractive index, and also the difference of the reflectivities between the patterned portion 131 and non-patterned portion 132 of the first patterned electrode layer 13 is minimized, so as to reduce the visibility of the patterned portion 131.

In some embodiments, the touch panel 1 further includes a covering layer 16 which is disposed on the side of the protection substrate 11 facing the first transparent substrate 12. In other embodiments, the covering layer 16 also can be disposed on the side of the protection substrate 11 away from the first transparent substrate 12. Furthermore, the covering layer 16 is located in the peripheral region of the protection substrate 11 to cover the wires (not shown) connecting the first patterned electrode layer 13 with the external circuit, or cover the circuit board (not shown), or cover other electronic elements. Herein for example, the covering layer 16 includes the light-blocking material of higher optical density, such as ink, photoresist material or their combination.

Figure 2:
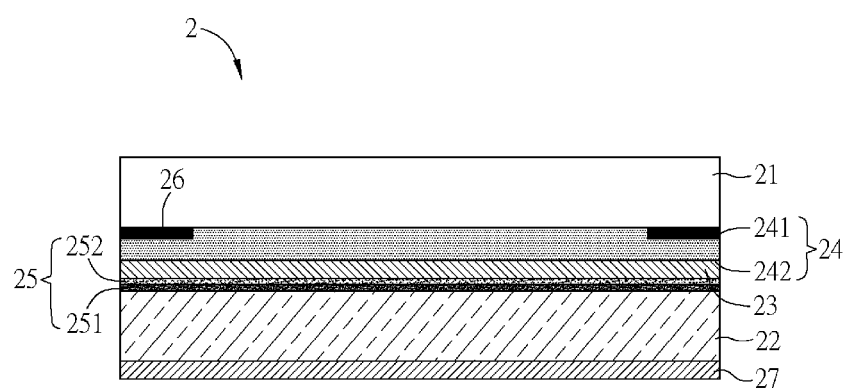
FIG. 2 is a schematic sectional diagram of a touch panel in accordance with one embodiment of the disclosure.

FIG. 2 is a schematic sectional diagram of a touch panel of the second embodiment of the disclosure. As shown in FIG. 2, the touch panel 2 includes the protection substrate 21, the first transparent substrate 22, the first patterned electrode layer 23, the first transparent adhesive layer 24, the refractive-index matching layer 25 and the covering layer 26. In some embodiments, the touch panel 2 further includes a second patterned electrode layer 27 disposed on the side of the first transparent substrate 22 away from the protection substrate 21, i.e. the side different from the first patterned electrode layer 23.

The first patterned electrode layer 23 includes the touch electrode of the first axial direction, and the second patterned electrode layer 27 includes the touch electrode of the second axial direction which crosses the first axial direction, for example, perpendicularly. The first patterned electrode layer 23 and the second patterned electrode layer 27 are both the transparent conductive films of ITO, and that is, the touch panel 2 is a double ITO (DITO) touch panel. Of course, the ITO also can be replaced by IZO, FTO, AZO or GZO for example. Likewise, the first patterned electrode layer 23 and the second patterned electrode layer 27 also can be embodied as the metal nanowire or metal mesh.

The refractive-index matching layer 25 is disposed between the first patterned electrode layer 23 and the first transparent substrate 22, and includes the first refractive-index matching layer 251 and the second refractive-index matching layer 252. The first refractive-index matching layer 251 is disposed between the first transparent substrate 22 and the second refractive-index matching layer 252, and the second refractive-index matching layer 252 is disposed between the first patterned electrode layer 23 and the first refractive-index matching layer 251. The refractive-index matching layer 25, the first patterned electrode layer 23 and the first transparent adhesive layer 24 are used for matching the refractive index, and the refractive index and thickness of the refractive-index matching layer 25 are adjusted to achieve the purpose of matching the refractive index so as to further reduce the visibility of the patterned portion. Moreover, the illustration of the refractive-index matching layer 25 can be comprehended by referring to the above embodiment and is therefore omitted here for conciseness.

In some embodiments, the refractive-index matching layer 25 is disposed between the first transparent substrate 22 and the second patterned electrode layer 27. Besides, the first refractive-index matching layer 251 is disposed between the first transparent substrate 22 and the second refractive-index matching layer 252 and the second refractive-index matching layer 252 is disposed between the second patterned electrode layer 27 and the first refractive-index matching layer 251, in consideration of further reducing the visibility of the patterned portion.

Likewise, the first transparent adhesive layer 24 has a first surface 241 and a second surface 242 which are disposed oppositely. The first surface 241 faces the protection substrate 21 and the second surface 242 faces the first transparent substrate 22. The refractive index of the second surface 242 is greater than that of the first surface 241, and the stickiness of the first surface 241 is greater than that of the second surface 242. In other words, the higher refractive index, which is greater than or equal to 1.65 and less than or equal to 1.72, of the second surface 242 of the first transparent adhesive layer 24 can help reducing the visibility of the patterned portion (referring to the patterned portion 131 in FIG. 1B) of the first patterned electrode layer 23 and second patterned electrode layer 27, and the higher stickiness of the first surface 241 can help the connection of the protection substrate 21 and first transparent substrate 22. The refractive index and features of the first transparent adhesive layer 24 can be comprehended by referring to the above embodiments and the related illustration is thus omitted here for conciseness.

Moreover, the illustration of the protection substrate 21, first transparent substrate 22 and covering layer 26 can be comprehended by referring to the above embodiments and therefore is omitted here for conciseness.

Figure 3:
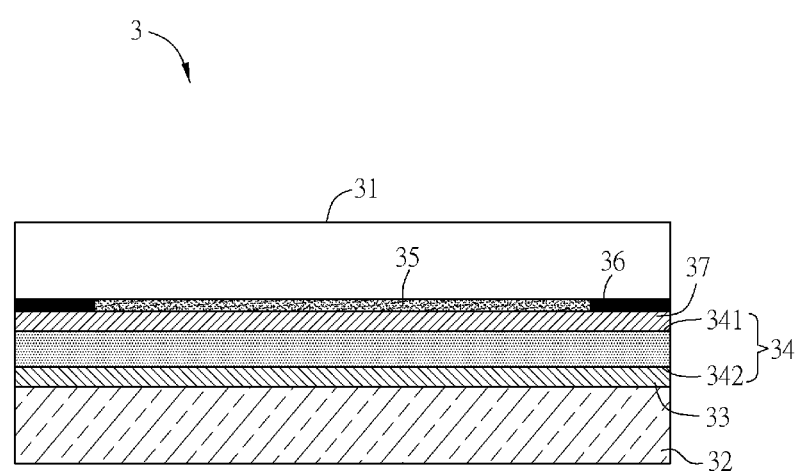
FIG. 3 is a schematic sectional diagram of a touch panel in accordance with one embodiment of the disclosure.

FIG. 3 is a schematic sectional diagram of a touch panel 3 in accordance with various embodiments of the disclosure. As shown in FIG. 3, the touch panel 3 includes the protection substrate 31, the first transparent substrate 32, the first patterned electrode layer 33, the first transparent adhesive layer 34, the refractive-index matching layer 35, the covering layer 36 and the second patterned electrode layer 37. The second patterned electrode layer 37 of the touch panel 3 is disposed on the protection substrate 31 and between the protection substrate 31 and the first transparent substrate 32.

Likewise, the first patterned electrode layer 33 includes the touch electrode of the first axial direction, and the second patterned electrode layer 37 includes the touch electrode of the second axial direction which crosses the first axial direction, for example, perpendicularly. The first patterned electrode layer 33 and the second patterned electrode layer 37 are embodied as the metal nanowire, transparent conductive film or metal mesh and the related illustration can be comprehended by referring to the above embodiments and is thus omitted here for conciseness. However, this disclosure is not limited thereto.

Likewise, the refractive-index matching layer 35, the first patterned electrode layer 33, the second patterned electrode layer 37 and the first transparent adhesive layer 34 are used for matching the refractive index, and the refractive index and thickness of the refractive-index matching layer 35 are adjusted to achieve the purpose of matching the refractive index. Herein for example, the refractive-index matching layer 35 is disposed between the first transparent substrate 32 and the first patterned electrode layer 33, or disposed between the protection substrate 31 and the second patterned electrode layer 37 as shown in FIG. 3.

Likewise, the first transparent adhesive layer 34 has a first surface 341 and a second surface 342 which are disposed oppositely. The first surface 341 faces the protection substrate 31 and the second surface 342 faces the first transparent substrate 32. The refractive index of the second surface 342 is greater than that of the first surface 341, and the stickiness of the first surface 341 is greater than that of the second surface 342. In other words, the higher refractive index of the second surface 342 of the first transparent adhesive layer 34 can help in reducing the visibility of the patterned portion (referring to the patterned portion 131 in FIG. 1B) of the first patterned electrode layer 33 and second patterned electrode layer 37, and the higher stickiness of the first surface 341 can help the connection of the protection substrate 31 and first transparent substrate 32. The refractive index and features of the first transparent adhesive layer 34 can be comprehended by referring to the above embodiments and the related illustration is thus omitted here for conciseness.

Figure 4:
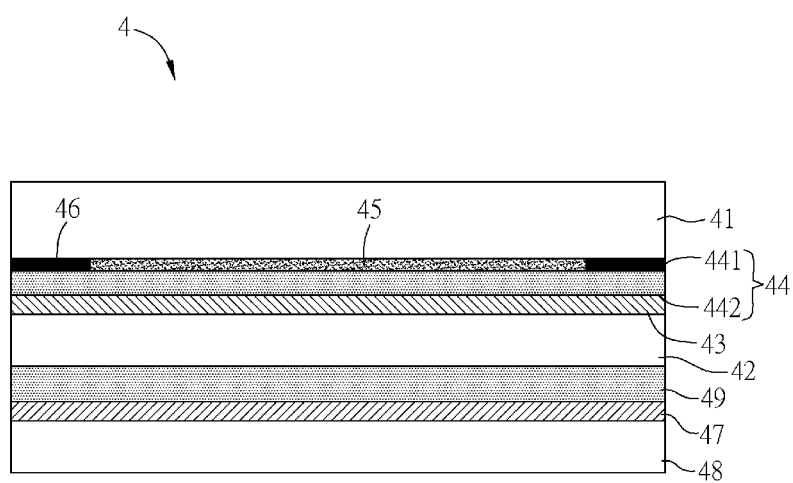
FIG. 4 is a schematic sectional diagram of a touch panel in accordance with one embodiment of the disclosure.

FIG. 4 is a schematic sectional diagram of a touch panel in accordance with various embodiments of the disclosure. As shown in FIG. 4, the touch panel 4 includes the protection substrate 41, the first transparent substrate 42, the first patterned electrode layer 43, the first transparent adhesive layer 44, the refractive-index matching layer 45 and the covering layer. The touch panel 4 further includes a second patterned electrode layer 47, a second transparent substrate 48 and a second transparent adhesive layer 49. The second patterned electrode layer 47 is disposed on the second transparent substrate 48 and between the first transparent substrate 42 and the second transparent substrate 48. Moreover, the first transparent substrate 42 and the second transparent substrate 48 are both polyester thin films.

Furthermore, the touch panel 4 is a cover glass/sensor film X/sensor film Y (GFF) touch panel. In the manufacturing process, the first patterned electrode layer 43 is formed on the first transparent substrate 42 and the second patterned electrode layer 47 is formed on the second transparent substrate 48, and then the first transparent substrate 42 and the second transparent substrate 48 are connected to each other by the second transparent adhesive layer 49. Then, the protection substrate 41, the first transparent substrate 42 and the second transparent substrate 48 are connected together by the first transparent adhesive layer 44. The second transparent adhesive layer 49 and the first transparent adhesive layer 44 in this embodiment can have the same material, and the related illustration can be comprehended by referring to the above embodiments and is thus omitted here for conciseness. Of course, the second transparent adhesive layer 49 also can be a normal OCA for the connection only.

Likewise, the first patterned electrode layer 43 includes the touch electrode of the first axial direction, and the second patterned electrode layer 47 includes the touch electrode of the second axial direction which crosses the first axial direction, for example, perpendicularly.

The refractive-index matching layer 45, the first electrode layer 43, the second patterned electrode layer 47, the first transparent adhesive layer 44 and the second transparent adhesive layer 49 are used for matching the refractive index, and the refractive index and thickness of the refractive-index matching layer 45 are adjusted to achieve the purpose of matching the refractive index.

Likewise, the first transparent adhesive layer 44 has a first surface 441 and a second surface 442 which are disposed oppositely. The first surface 441 faces the protection substrate 41 and the second surface 442 faces the first transparent substrate 42. The refractive index of the second surface 442 is greater than that of the first surface 441, and the stickiness of the first surface 441 is greater than that of the second surface 442. In other words, the higher refractive index of the second surface 442 of the first transparent adhesive layer 44 can help reducing the visibility of the patterned portion (referring to the patterned portion 131 in FIG. 1B) of the first patterned electrode layer 43 and second patterned electrode layer 47, and the higher stickiness of the first surface 441 can help the connection of the protection substrate 41 and first transparent substrate 42. The refractive index and features of the first transparent adhesive layer 44 can be comprehended by referring to the above embodiments and the related illustration is thus omitted here for conciseness.

Figure 5:
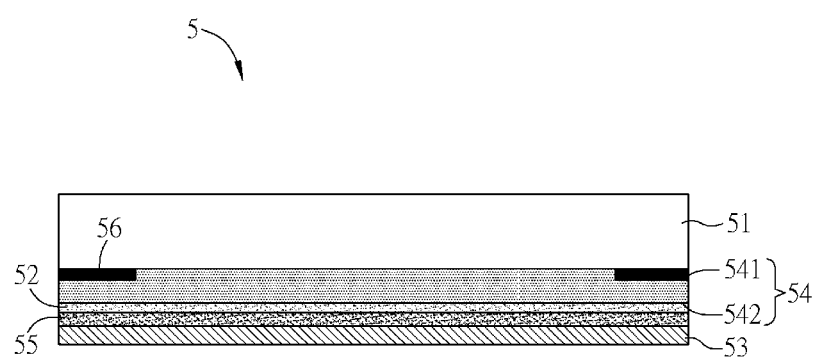
FIG. 5 is a schematic sectional diagram of a touch panel in accordance with one embodiment of the disclosure.

FIG. 5 is a schematic sectional diagram of a touch panel in accordance with various embodiments of the disclosure. As shown in FIG. 5, the touch panel 5 includes a protection substrate 51, a transparent substrate 52, a first patterned electrode layer 53 and a first transparent adhesive layer 54. The transparent substrate 52 and the protection substrate 51 are disposed oppositely. The first patterned electrode layer 53 is disposed on the side of the transparent substrate 52 away from the protection substrate 51. The first transparent adhesive layer 54 is disposed between the protection substrate 51 and the transparent substrate 52 to attach the transparent substrate 52 with the first patterned electrode layer 53 to the protection substrate 51.

In some embodiments, the first surface 541 of the first transparent adhesive layer 54 faces the protection substrate 51 and the second surface 542 thereof faces the transparent substrate 52. Likewise, the refractive index of the second surface 542 is greater than that of the first surface 541, and the stickiness of the first surface 541 is greater than that of the second surface 542. Accordingly, by the first transparent adhesive layer 54 disposed between the protection substrate 51 and the transparent substrate 52, the connection of the protection substrate 51 and transparent substrate 52 and the reduction of the visibility of the patterned portion (referring to the patterned portion 131 in FIG. 1B) can be both achieved. The refractive index and features of the first transparent adhesive layer 54 can be comprehended by referring to the above embodiments and the related illustration is thus omitted here for conciseness.

The first patterned electrode layer 53 and the transparent substrate 52 are formed on the protection substrate 51 by a film transfer process, and the method thereof includes, for example, the following steps of: providing a carrying substrate (not shown); forming the transparent substrate 52 such as a polyimide film on the carrying substrate and then forming the first patterned electrode layer 53 on the transparent substrate 52 which is disposed between the carrying substrate and the first patterned electrode layer 53; forming a transfer layer (not shown) such as a single-sided adhesive on, the first patterned electrode layer 53; removing the carrying substrate; and attaching the first patterned electrode layer 53, the transparent substrate 52 and the transfer layer to the protection substrate 51 by the first transparent adhesive layer 54, wherein the transparent substrate 52 and the first patterned electrode layer 53 are disposed between the first transparent adhesive layer 54 and the transfer layer; and removing the transfer layer. Accordingly, the first patterned electrode layer 53 and the transparent substrate 52 are formed on the protection substrate 51 by the first transparent adhesive layer 54. To be noted, for the case of the first patterned electrode layer 53 and transparent substrate 52 attached to the protection substrate 51, a side of the transparent substrate 52 is attached to the protection substrate 51, so that the transparent substrate 52 is disposed between the first patterned electrode layer 53 and the first transparent adhesive layer 54.

The material of the transparent substrate 52 is polyimide favorably, and can be formed by the solidification following the solution coating or by other proper methods. The thickness of the transparent substrate 52 is very thin in relation to the common glass substrate, and can be about in a range between 0.1 µm and 15 µm or favorably between 2 µm and 5 µm.

Accordingly, the first patterned electrode layer 53 and the transparent substrate 52 are formed on the protection substrate 51 by the above-mentioned film transfer process. The transparent substrate 52 is very thin, and furthermore, the first patterned electrode layer 53 is formed on the transparent substrate 52 by the support effect of the carrying substrate, then the carrying substrate is removed, and then the transparent substrate 52 and the first patterned electrode layer 53 are attached to the protection substrate 51 by the transfer effect of the transfer layer. Thereby, the entire thickness of the touch panel can be reduced.

In some embodiments, the touch panel 5 further includes the refractive-index matching layer 55 disposed between the transparent substrate 52 and the first patterned electrode layer 53. The material and features of the refractive-index matching layer 55 can be comprehended by referring to the above embodiments. Moreover, the refractive-index matching layer 55, the first patterned electrode layer 53, and the first transparent adhesive layer 54 are used for matching the refractive index, and the refractive index and thickness of the refractive-index matching layer 55 are adjusted to achieve the effect of further reducing the visibility of the patterned portion of the first patterned electrode layer 53.

In some embodiments, the touch panel 5 includes the covering layer 56 disposed on the side of the protection substrate 51 facing the transparent substrate 52. The covering layer 56 is disposed in the peripheral region of the protection substrate 51 to cover the wires (not shown) connecting the first patterned electrode layer 53, or cover the circuit board (not shown), or cover other electronic elements. Herein for example, the covering layer 56 includes the light-blocking material of higher optical density, such as ink, photoresist material or their combination.

Summarily, in the touch panel of this disclosure, the protection substrate and the first transparent substrate are attached together by the first transparent adhesive layer of high refractive index. Accordingly, the first transparent adhesive layer not only can provide the adhesion effect, but also can make the reflectivities of the patterned and non-patterned portions of the patterned electrode layer reach the same by its particular high refractive index, so that the electrode pattern of the touch panel is less visible or even invisible. Therefore, the appearance effect of the touch panel can be improved, and besides, the multi-layer optical film (or a plurality of optical films) can be reduced so that the touch panel can be made lighter and thinner and the manufacturing method can be simplified.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:
1. A touch panel, comprising:
a protection substrate;
a first transparent substrate;
a first patterned electrode layer disposed on the first transparent substrate and between the protection substrate and the first transparent substrate, wherein the first patterned electrode layer comprises a patterned portion and a non-patterned portion; and
a first transparent adhesive layer disposed between the protection substrate and the first patterned electrode layer, wherein:

the first transparent adhesive layer has a first surface and a second surface disposed opposite the first surface, the first surface faces the protection substrate and the second surface faces the first transparent substrate, a refractive index of the second surface is greater than a refractive index of the first surface, a refractive index of the first transparent adhesive layer is greater than or equal to 1.65 and less than or equal to 1.72, and a reflectivity of the patterned portion and a reflectivity of the non-patterned portion are substantially equal.

2. The touch panel of claim 1, further comprising:
a second patterned electrode layer disposed on a side of the first transparent substrate that faces away from the protection substrate.

3. The touch panel of claim 1, further comprising:
a second patterned electrode layer disposed on the protection substrate and between the protection substrate and the first transparent adhesive layer.

4. The touch panel of claim 1, further comprising:
a refractive-index matching layer disposed between the first patterned electrode layer and the first transparent substrate.

5. The touch panel of claim 4, wherein:
the refractive-index matching layer comprises a first refractive-index matching layer and a second refractive-index matching layer,
the first refractive-index matching layer is disposed between the first transparent substrate and the second refractive-index matching layer and has a refractive index in a range between 2.0 and 2.5, and
the second refractive-index matching layer is disposed between the first patterned electrode layer and the first refractive-index matching layer and has a refractive index in a range between 1.3 and 1.6.

6. The touch panel of claim 2, further comprising:
a refractive-index matching layer disposed between the first patterned electrode layer and the first transparent substrate.

7. The touch panel of claim 6, wherein:
the refractive-index matching layer comprises a first refractive-index matching layer and a second refractive-index matching layer,
the first refractive-index matching layer is disposed between the first transparent substrate and the second refractive-index matching layer and has a refractive index in a range between 2.0 and 2.5, and
the second refractive-index matching layer is disposed between the first patterned electrode layer and the first refractive-index matching layer and has a refractive index in a range between 1.3 and 1.6.

8. The touch panel of claim 3, further comprising:
a refractive-index matching layer disposed between the first patterned electrode layer and the first transparent substrate.

9. The touch panel of claim 8, wherein:
the refractive-index matching layer comprises a first refractive-index matching layer and a second refractive-index matching layer,
the first refractive-index matching layer is disposed between the first transparent substrate and the second refractive-index matching layer and has a refractive index in a range between 2.0 and 2.5, and
the second refractive-index matching layer is disposed between the first patterned electrode layer and the first refractive-index matching layer and has a refractive index in a range between 1.3 and 1.6.

10. The touch panel of claim 1, further comprising:
a second transparent substrate;
a second patterned electrode layer disposed on the second transparent substrate; and
a second transparent adhesive layer disposed between the first transparent substrate and the second patterned electrode layer.

11. The touch panel of claim 10, further comprising:
a refractive-index matching layer disposed between the protection substrate and the first transparent adhesive layer.

12. A touch panel, comprising:
a protection substrate;
a transparent substrate;
a first patterned electrode layer disposed on a side of the transparent substrate that faces away from the protection substrate, wherein the first patterned electrode layer includes a patterned portion and a non-patterned portion; and
a first transparent adhesive layer disposed between the protection substrate and the transparent substrate, wherein:
the first transparent adhesive layer has a first surface and a second surface disposed opposite the first surface,
the first surface faces the protection substrate and the second surface faces the transparent substrate,
a refractive index of the second surface is greater than a refractive index of the first surface,
the refractive index of the first transparent adhesive layer is greater than or equal to 1.65 and less than or equal to 1.72, and
a reflectivity of the patterned portion and a reflectivity of the non-patterned portion are substantially equal.

13. The touch panel of claim 12, wherein the transparent substrate and the first patterned electrode layer are formed on a carrying substrate and then transferred to the protection substrate.

14. The touch panel of claim 12, wherein a thickness of the transparent substrate is in a range between 0.1 μm and 15 μm.

15. The touch panel of claim 12, further comprising:
a refractive-index matching layer disposed between the transparent substrate and the first patterned electrode layer.

16. A touch panel, comprising:
a protection substrate;
a first transparent substrate;
a first patterned electrode layer disposed on the first transparent substrate and between the protection substrate and the first transparent substrate, wherein the first patterned electrode layer comprises a patterned portion and a non-patterned portion; and
a first transparent adhesive layer disposed between the protection substrate and the first patterned electrode layer,
wherein:
the first transparent adhesive layer has a first surface and a second surface disposed opposite the first surface,
the first surface faces the protection substrate and the second surface faces the first transparent substrate, and
a stickiness of the first surface is greater than a stickiness of the second surface.

17. The touch panel of claim 16, wherein a refractive index of the second surface is greater than a refractive index of the first surface.

18. The touch panel of claim 17, wherein a refractive index of the first transparent adhesive layer is greater than or equal to 1.65 and less than or equal to 1.72.

19. The touch panel of claim 1, wherein a stickiness of the first surface is greater than a stickiness of the second surface.

20. The touch panel of claim 12, wherein a stickiness of the first surface is greater than a stickiness of the second surface.

* * * * *